Feb. 2, 1960
C. E. ATKINS
2,923,829
PHOTOELECTRIC CONTROL CIRCUIT
Filed Feb. 18, 1954
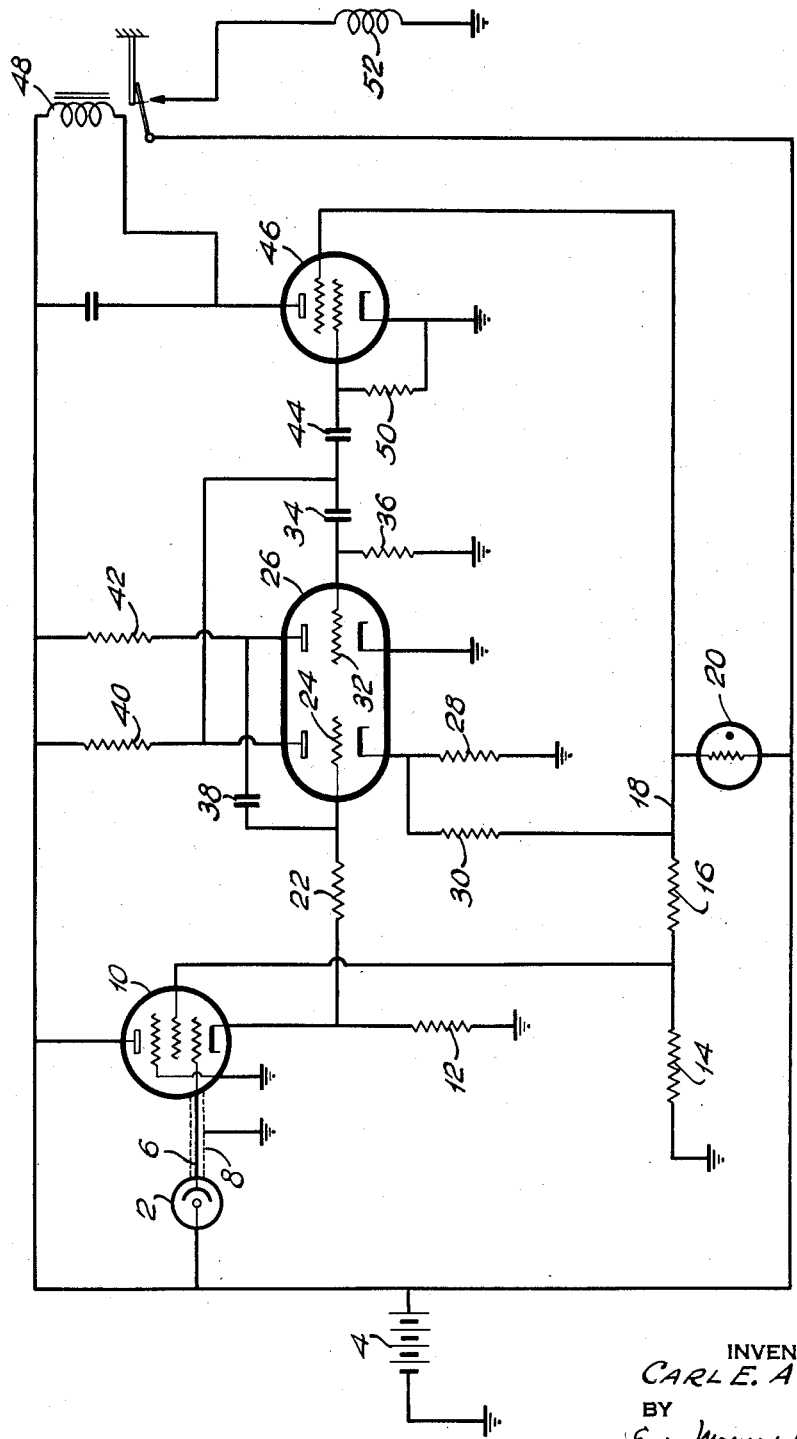
INVENTOR
CARL E. ATKINS
BY
Eyre, Mann & Barrows
ATTORNEYS

United States Patent Office 2,923,829
Patented Feb. 2, 1960

2,923,829

PHOTOELECTRIC CONTROL CIRCUIT

Carl E. Atkins, Bloomfield, N.J., assignor to Tung-Sol Electric Inc., a corporation of Delaware Application February 18, 1954, Serial No. 411,208

9 Claims. (Cl. 250—214)

The present invention relates to photoelectric control circuits of the general type disclosed and broadly claimed in my co-pending application Serial No. 375,236, filed August 19, 1953, now Patent No. 2,830,192, which is a continuation-in-part of my prior application Serial No. 297,946, filed July 9, 1952 (now abandoned), and in my co-pending application Serial No. 384,497, filed October 6, 1953 (now abandoned), of which the present application is a continuation-in-part. In the circuit of the present invention as in those of the said co-pending applications, minute currents are accumulated and then converted to voltage pulses varying in amplitude or in frequency of occurrence as a function of light intensity. Also as in the circuits of my said prior applications the created voltage pulses are used for control of a relay, or the like. In the present circuit, as in those of my prior applications, positive control pulses are applied to the grid of a relay control tube when light is incident on the photocathode of a photoelectric tube and advantage is taken of the self-rectifying properties of the grid circuit to avoid the necessity of providing a separate rectifier. Circuits of the above mentioned type are of particular value for control of the dimming switch of automobile headlamps in response to reception of light from the headlamps of oncoming cars.

In accordance with the present invention an oscillatory circuit is provided which, when sufficient light is incident on a photo sensitive element breaks into oscillation and transmits control pulses to a relay control tube or the like. When light ceases to fall upon the photo sensitive element, the oscillations cease. The particular oscillatory circuit illustrated in the drawing is a "single shot" multivibrator which is connected in the output circuit of a gate tube operating as a cathode follower. The control grid of the gate tube is connected to the photo sensitive element, which may be, and preferably is, the photocathode of a two-electrode photoelectric tube such as a 930 or 925. The gate tube, the photoelectric tube, and the tube or tubes comprising the multivibrator circuit, together with the relay control tube responsive to the output of the multivibrator circuit, are energized from a low voltage source of the order of a car-carried battery.

For a better understanding of the invention and of the advantageous features thereof, reference may be had to the accompanying drawing of which the single figure is a schematic diagram of a circuit embodying the invention.

In the drawing a simple two-electrode photoelectric tube 2 is shown with its anode connected to the positive terminal of a battery 4, the negative terminal of which is grounded. The battery 4 may be, for example, a 12 volt battery. The photocathode of tube 2 is connected through a lead 6 provided with a grounded shield 8 to the control grid of a pentode 10 connected as a cathode follower. Tube 10 may be a 6AK6. The anode of the gate tube 10 is connected to the positive terminal of the battery 4 and the cathode of the gate tube is connected to ground through a load resistor 12. The No. 2, or screen grid, of the tube is maintained at a small positive potential by connection to the junction of a pair of resistors 14 and 16 connected in series between ground and a line 18 maintained at a fixed potential less than that of battery 4 by means of a ballast tube 20 inserted between the line 18 and the positive terminal of the battery. The No. 3, or suppressor grid, of the tube 10 is grounded. The junction of the cathode of tube 10 with load resistor 12 is connected through a resistor 22 to the control grid 24 of the first half of a double triode 26. A resistor 28 is connected between the cathode associated with grid 24 and ground and positive potential from line 18 is impressed on this cathode through a resistor 30. The cathode of the second half of the double triode 26 is grounded and the control grid 32 thereof is connected through a capacitor 34 to the anode associated with grid 24. The grid 32 is also connected to ground through a bias resistor 36. The anode associated with grid 32 is similarly connected through a capacitor 38 with control grid 24. The positive terminal of battery 4 is connected through separate dropping resistors 40 and 42 to the anodes of tube 26. The anode associated with grid 24 is connected through a capacitor 44 with the control grid of a relay control tube 46, the anode of which is connected through the winding of a relay 48 with the positive terminal of battery 4. A grid resistor 50 is provided between ground and the control grid of the relay control tube 46 and regulated potential is applied to the screen grid of that tube from line 18.

The operation of the above described circuit will be clear from the following:

When no light falls on the cathode of the photoelectric tube 2, no current is passed by the photoelectric tube. The capacity comprising the lead 6 and grounded shield 8 and the inherent capacity between the control grid and the other electrodes of the tube 10 becomes negatively charged by the electrons emanating from the cathode of the gate tube and this charge being unable to dissipate through the photoelectric tube 2 is such as to maintain the control grid at a negative potential. Under these circumstances, tube 10 passes only a minute current, the first half of the double triode 26 is blocked by the positive potential applied to the cathode thereof, whereas the second half of tube 26 is conducting as is also the relay control tube 46. Relay 48 is energized and over its contacts holds open the circuit of a power relay 52. Power relay 52 may control the dimmer switch of an automobile. If light is incident on the photocathode, the negative charge on the grid of tube 10 leaks off through the photo tube, increasing the current through the gate tube and raising the potential of grid 24 of the double triode by virtue of its connection to the cathode of the gate tube. When the potential of grid 24 is sufficiently positive, the first half of the double triode starts to conduct causing a drop in potential at the anode thereof and, accordingly, a drop in potential at grid 32. The consequent increase in potential at the anode of the second half of the tube impresses a positive pulse on grid 24, momentarily increasing the current through the first half of the tube. The potential of grid 32, which was driven negative when the first half of the tube started to conduct, gradually rises as capacitor 34 discharges through resistor 36. When the threshold potential is reached by grid 32, conduction by the second half of the tube 26 is resumed with resultant application of a negative pulse to grid 24. A positive pulse then appears at the anode of the first half of the tube and this pulse is transmitted through capacitor 44 to the grid of the relay control or power tube 46. If light is still incident on the photocathode of the photoelectric tube, the potential of grid 24 will return to a sufficient positive potential to maintain the multivibrator circuit in oscillation, thus causing a series of positive pulses to be delivered to the control grid of the relay control tube. In the absence of light, however, the first half of the double triode will remain blocked after application of a negative pulse to the control grid thereof.

When positive pulses are impressed on the control grid of the relay control tube 46, as above described, the current through the tube is first momentarily increased and electrons flow to the grid to charge the capacitor 44. As grid resistor 50 is large, these electrons can not leak off rapidly and hence tend to drive the grid negative, thus lowering the grid potential and correspondingly reducing the current through the relay 48, finally causing release of the relay and energization of the power relay 52.

During oscillation of the multivibrator circuit negative pulses are impressed upon the cathode of the gate tube, tending to cause rapid recharge of the accumulative means associated with the grid thereof and insuring rapid response of the circuit to cessation of light. Furthermore, when the multivibrator circuit is oscillating, the grid current passed by the first half of the double triode 26, because of the connection of grid 24 through resistor 22 to the cathode of the gate tube, acts to increase the rapidity of response of the gate tube to cessation of light.

From the foregoing description it will be apparent that the circuit operates to transmit voltage pulses when and only when light is incident upon the photocathode of the photoelectric tube and therefore that the invention provides a simple and effective means for control of an element in response to incidence of light. The circuit, while being particularly valuable for use in control of automobile headlamps, is of course not limited to such specific application as it could be effectively employed wherever a control in response to incidence of light is desired.

Obviously various changes could be made in the various elements shown in the drawing. For example, although the means for accumulating minute currents have been indicated as comprising at least in part a lead provided with a grounded shield, obviously depending upon the particular tube employed for the gate tube and for the photoelectric tube, the inherent capacity of the circuit might be and usually is sufficient for the purpose without deliberate provision of separate accumulating means. Furthermore, the smaller the capacity of the accumulating means, the more rapid the response to change in light intensity. Also, although the output, or power tube, has been shown as immediately following the oscillatory circuit, obviously one or more stages of amplification could be provided between the oscillatory circuit and the power tube. With or without such additional amplifying means the power tube, instead of being a tetrode, as shown, could be a space-charge-grid type tube to provide higher output current, as disclosed in another of my co-pending applications, Serial No. 375,177, filed August 19, 1953. Other variations within the scope of the invention will occur to those skilled in the art.

The following is claimed:

1. A light responsive circuit comprising in combination photoelectric means, an oscillatory circuit adapted, when oscillating, to yield voltage pulses, biasing means normally preventing oscillation of said oscillatory circuit, a normally energized relay control tube coupled to said oscillatory circuit for deenergization in response to voltage pulses therefrom, and means responsive to incidence of light on said photoelectric means for rendering inoperative said biasing means.

2. The light responsive circuit according to claim 1 wherein said oscillatory circuit is a multivibrator and said biasing means normally renders one part thereof non-conducting.

3. The light responsive circuit according to claim 1 wherein said means for rendering said biasing means inoperative include an electronic tube having a control grid connected to said photoelectric means, and a cathode connected to ground through a cathode resistor, said cathode being connected to said oscillatory circuit to impress a control potential thereon acting in opposition to said biasing means.

4. A light responsive circuit comprising in combination a photoelectric tube having a photo-cathode, an electronic tube having a control grid, cathode and anode, a connection between said photocathode and said control grid, a low voltage source of energizing potential for said anode, a cathode circuit including a resistor connected to said cathode, a normally energized output electronic tube having a control grid, an oscillatory circuit interposed between said cathode and the control grid of said output tube and biasing means preventing oscillation of said oscillatory circuit except when the current through said first mentioned electronic tube exceeds a predetermined value by virtue of said photoelectric tube becoming conductive as a result of light incident on said photo-cathode, said oscillatory circuit when oscillating impressing voltage pulses on the control grid of said output tube tending to reduce the output current thereof.

5. The light responsive circuit according to claim 4 including a capacitor between said oscillatory circuit and the control grid of said output tube and a high resistor connected between ground and said last mentioned grid, whereby, when positive voltage pulses are impressed from said oscillatory circuit through said capacitor upon said grid, self-rectification is obtained by virtue of said resistor to drive the grid negative.

6. The light responsive circuit according to claim 4 wherein said oscillatory circuit is a multivibrator including two triodes, said biasing means being connected to one of said triodes to render the same normally non-conductive, and the cathode of said first mentioned electronic tube being connected to said last mentioned one of said triodes.

7. The light responsive circuit according to claim 4 wherein said oscillatory circuit includes a triode having a grid and circuit therefor, said grid circuit being at least in part common to the cathode circuit of said first mentioned electronic tube.

8. A low voltage light responsive circuit comprising a photoelectric tube having a photocathode, an electronic tube having an anode, a control grid and a cathode, a low voltage source of substantially constant voltage connected to said anode, a cathode resistor connected between the negative terminal of said source and said cathode, a connection between said photocathode and control grid providing current accumulating means, a multivibrator comprising two triodes, means normally biasing one of said triodes to cut off, a connection between said cathode and said last mentioned triode to render the same conductive and permit oscillation of the multivibrator when said cathode is at a predetermined potential and a relay control tube responsive to pulses delivered by said multivibrator when said multivibrator is oscillating, said triodes and said relay control tube being supplied with operating energy by said low voltage source.

9. The low voltage circuit according to claim 8 wherein said relay control tube is normally conducting, and the control grid thereof is provided with a high grid resistor and is connected to the multivibrator through a capacitor, whereby positive pulses delivered through said capacitor tend to drive negative the grid of said relay tube due to self-rectification provided by said resistor.

References Cited in the file of this patent

UNITED STATES PATENTS

| 2,284,024 | Stevens | May 26, 1942 |
| 2,431,394 | Friedman | Nov. 25, 1947 |
| 2,632,040 | Rabinow | Mar. 17, 1953 |
| 2,682,624 | Atkins | June 29, 1954 |
| 2,730,629 | Atkins | Jan. 10, 1956 |
| 2,798,964 | Atkins | July 9, 1957 |